United States Patent

Clark

[15] 3,646,821

[45] Mar. 7, 1972

[54] AM-FM TUNER HAVING FIVE PUSHBUTTONS WITH TEN SELECTIONS

[72] Inventor: Alfred J. Clark, Palatine, Ill.

[73] Assignee: Motorola, Inc., Franklin Park, Ill.

[22] Filed: Mar. 18, 1970

[21] Appl. No.: 20,496

[52] U.S. Cl. ........................................74/10.33, 334/7

[51] Int. Cl. ........................................F16h 35/18

[58] Field of Search..................74/10.33, 31, 29, 27, 37, 35; 334/7

[56] References Cited

UNITED STATES PATENTS 3,415,129 12/1968 Stamm..................................74/10.33

3,463,017 8/1969 Stamm et al...........................74/10.33

*Primary Examiner*—Milton Kaufman

*Attorney*—Mueller and Aichele

[57] ABSTRACT

A tuning mechanism for AM-FM radio receivers of the pushbutton-type wherein first and second groups of slide bar assemblies are positioned to be selectively actuated by a single group of pushbutton actuating bars. Actuation of the pushbutton actuating bar will actuate one or the other of the slide bar assemblies to change the station on the radio depending on the position of a selector means. A fingered lever is pivotally secured to the pushbutton actuating bar to have a finger portion engage a notch in one or the other of the slide bar assemblies on one side or the other side of said pushbutton actuating bar. The finger portion moves within a guide channel to prevent jamming when the locking member is in an unlocked position.

8 Claims, 5 Drawing Figures

INVENTOR
ALFRED J. CLARK

BY Mueller, Aichele & Rauner
ATTORNEYS

AM-FM TUNER HAVING FIVE PUSHBUTTONS WITH TEN SELECTIONS

BACKGROUND OF THE INVENTION

This invention relates generally to pushbutton tuners for automobile radios, or the like, and more particularly to pushbutton tuners wherein each pushbutton is used to select more than one radio station. The invention has a particular utility when used with AM-FM automobile radios to permit the use of a single set of pushbuttons for selecting stations within both the AM and FM bands.

Heretofore, AM-FM radio tuners have been provided with means for selecting two groups of actuating devices so they can be actuated by a single set of pushbuttons or the like. This feature allows twice the number of radio stations to be selected by pushbutton operation then the number of pushbuttons actually available.

Pushbutton tuners providing two actuating devices for each pushbutton have had various problems of jamming when one or more of the actuating devices is in an unlocked condition and is in the process of being relocked while inadvertently the selector means is being or attempted to be shifted either from an AM position to an FM position or from an FM position to an AM position.

SUMMARY OF THE INVENTION

Accordingly, it is an object of this invention to provide an AM-FM radio tuner for pushbutton operation which cannot jam under any condition of operation.

Another object of this invention is to provide an AM-FM radio tuner for pushbutton operation which is simple and inexpensive to manufacture and efficient and reliable in operation.

A feature of this invention is the provision of a guide channel formed by the relationship of components of a pushbutton actuating bar and a guide member such that a finger portion of a selecting lever is at all times within this guide channel when that particular slide bar assembly is in an unlocked condition to prevent shifting of the selector means either from aM to FM or from FM to AM conditions while relocking the slide bar assembly, thus preventing jamming of the mechanism.

Briefly, this invention provides a plurality of pushbutton actuating bars and slide bar assemblies mounted within a housing to engage a tuning mechanism therein and to have a portion of each of the pushbutton actuating bars extending through a aperture formed in the front wall of the housing to receive a pushbutton thereat to be depressed or pulled manually by an operator. A first group of slide bar assemblies is positioned immediately adjacent one side of a corresponding number of associated pushbutton actuating bars and a second group of slide bar assemblies is positioned immediately adjacent the other side of these actuating bars. Each slide bar assembly includes a guide member which carries an actuating cam lockable in any one of a plurality of positions to engage with spaced rotating bars of the tuning mechanism to tune the radio by shifting these bars to correspond to the position of the cam in a well-known manner. Associated with the guide member is a locking member and spring means which lock and hold the cam in its preselected position, and which can be released or unlocked to loosen the cam to be reset to a new position if desired.

Preferably, the guide member and the locking member of each slide bar assembly on both sides of the pushbutton actuating bar have notches formed therein to be in alignment with one another when the locking member is in the locked condition, thus holding the actuating cam in a fixed position and to be misaligned from one another when the locking member is in an unlocked condition to release the actuating cam for adjustment. Most advantageously, when any one of the slide bar assemblies is in its unlocked condition, the notched portion of the locking member moves in a guide channel formed by the pushbutton actuating bar and the slide member. A fingered lever is pivotedly secured to the pushbutton actuating bar and has finger portions engaging the notches formed in the locking members on either side of the pushbutton actuating bar but only one at a time. That is, the other finger portion not engaged with a locking member is completely disengaged from all portions of the slide bar assembly not being actuated, while the other finger portion so engaged with the notch also moves within the guide channel during unlocking and relocking of the actuating cam. This confined movement of the finger portion of the pivotal lever prevents inadvertent actuation of a selector plate or bar between AM and FM conditions while any one of the pushbutton actuating bars is in its pulled out or unlocked condition for resetting of an actuating cam. To at all times hold the fingered lever in a predetermined position, a selector pin extends therefrom into a pair of elongated parallel slots associated with each fingered lever and a passageway is formed between each of these slots to allow the selector pin to move between the slots selectively upon actuation of a slide plate having a single elongated slot therein for each pair of parallel elongated slots and which single slot receives the selector pin to move the same and which is in alignment with one or the other of the parallel pair of slots depending on the mode of operation of the tuner.

DESCRIPTION OF THE PREFERRED EMBODIMENT

Figures 1, 2, 3, 4:
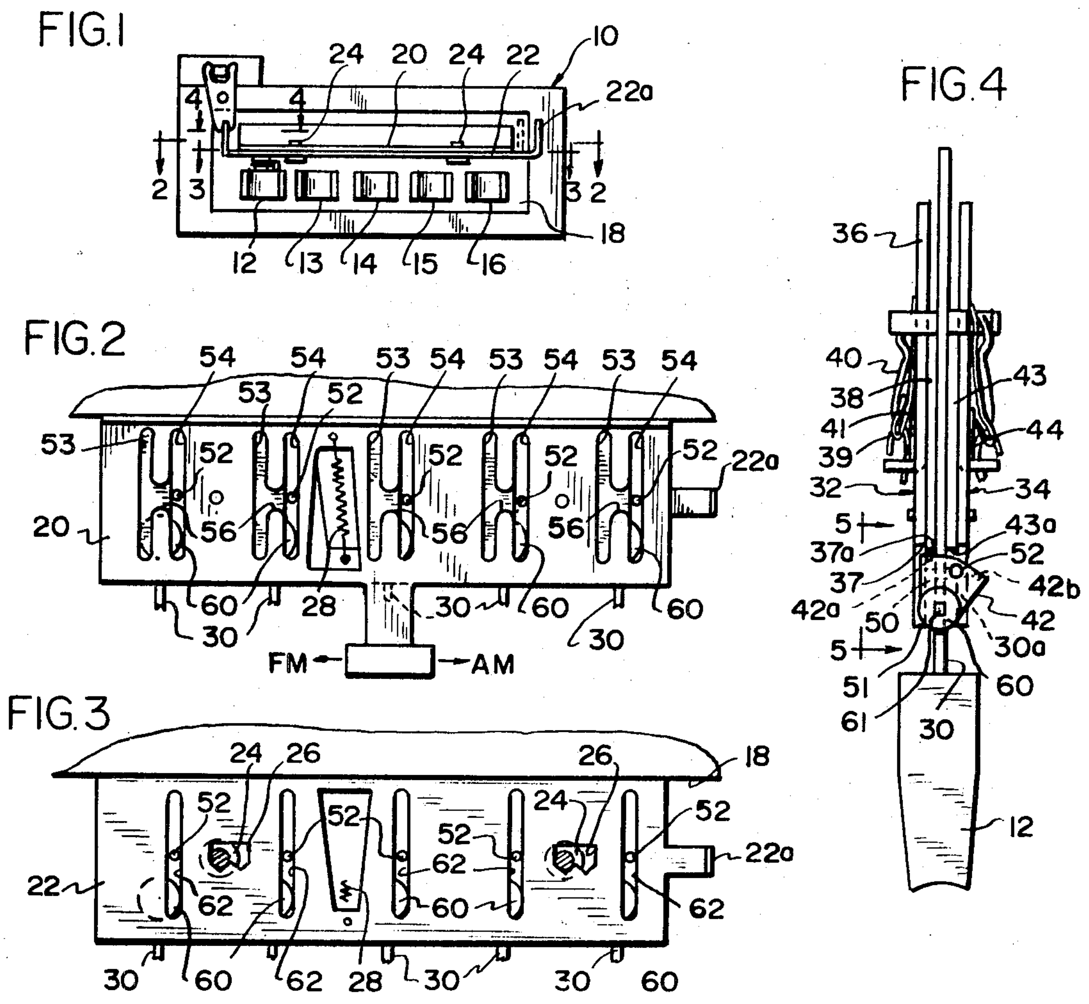
FIG. 1 is a front view of a pushbutton radio tuner illustrating a plurality of in-line pushbuttons extending outwardly therefrom.
FIG. 2 is a top view taken substantially along the line 2—2 of FIG. 1 illustrating a stationary guide plate extending from the front wall of the tuner housing.
FIG. 3 is taken substantially along line 3—3 of FIG. 1 illustrating the slidable selector plate of FIG. 1 which moves between two positions to provide two modes of operation of the tuner.
FIG. 4 is an enlarged top view of one of the pushbutton actuating bars and associated pair of slide bar assemblies.

Referring now to FIG. 1, there is seen a receiver tuner designated generally by reference numeral 10 which has a plurality of pushbuttons 12, 13, 14, 15 and 16 extending forwardly therefrom through an apertured front wall 18. A guide plate 20 is fixedly secured to the front wall 18 and extends therefrom over extended portions of a plurality of actuating devices and terminates short of the pushbuttons 12–16. A slidable selector plate 22 moves left and right of the guide plate 20, as seen in FIG. 1, and includes tab means **22*a* which is directly or indirectly actuated by the operator to cause such movement. The selector plate 22 is held in position by large head rivets 24 which extend through double notches 26 formed in the selector plate 22 and which act as detents. To maintain a bias on the selector plate 22 so that the rivet 24 engages the detent portions of the notches 26, a spring 28 has one end thereof connected to the guide plate 20 and the other end thereof connected to the selector plate 22**.

Figure 5:
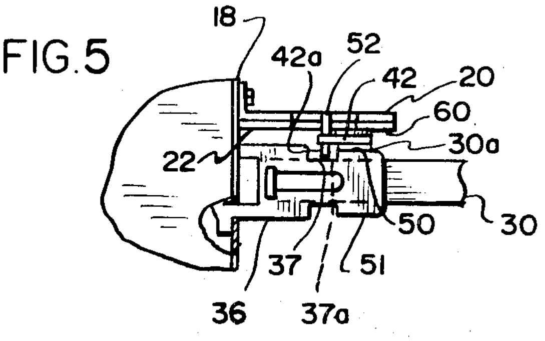
FIG. 5 illustrates a fragmentary portion taken along line 5—5 of FIG. 4 showing the side view of a slide bar assembly.

For a better understanding of this invention, reference is now made to FIGS. 4 and 5 which illustrate a top and side view of one of the pushbutton actuating devices within the housing 10. Here a pushbutton actuating bar 30 is confined in slots formed in the front and rear walls of the housing, not shown, and has the pushbutton 12 secured to the extended portion thereof. A first slide bar assembly 32 is positioned immediately adjacent one side of the pushbutton actuating bar 30 and a second slide bar assembly 34 is positioned immediately adjacent the other side of the pushbutton actuating bar 30. The slide bar assemblies 32 and 34 also are guided for movement through slots in the front and rear walls of the housing, not shown. The slide bar assemblies 32 and 34 are substantially the same and therefore only one will be disclosed in detail.

The slide bar assembly 32 includes a guide member 36 which has a notch 37 formed therein at the portion of the guide member which extends outwardly of the front wall 18. Also associated with the slide bar assembly 32 is a locking member 38 which cooperates with a spring member 39 and a cam lock 40 securely to hold in position an adjustable actuating cam 41. The actuating cam 41 engages the parallel rotary bars, not shown, within the tuner housing 10 in the conventional well-known manner to change radio stations.

To mechanically couple the pushbutton actuating bar 30 to the slide bar assembly 32, a fingered lever 42 is pivotally secured to the pushbutton actuating bar 30 and has fingered portions **42*a* and 42*b* which extend downwardly to move through the aligned notches within the slide bar assemblies 32 and 34. As shown, the fingered portion 42*a* extends into the notch 37*a* of the locking member 38 so that forward movement of the actuating bar 30 will also cause forward movement of the slide bar assembly 32 to change the radio station received by the tuner 10. However, when the fingered lever 42 is moved to the left in FIG. 4, the fingered portion 42*b* engages a notch 43*a* formed in a locking member 43 of the slide bar assembly 34 to cause movement of this assembly with movement of the actuating bar 30. To unlock the cam 41 or a cam 44, whichever the case may be, the fingered portion, here illustrated as the fingered portion 42*a*, engages the notch of the locking member 38 and by pulling the pushbutton 12 the locking member 38 will move relative to the guide member 36 to unlock the cam in the conventional manner. At this time, the fingered portion 42*a* moves within a guide channel 50 formed between the pushbutton actuating bar 30 at the portion 30*a*, FIG. 5, thereof and an extended portion 51 of the guide member 36. Therefore, with the slide bar assembly in an unlocked condition, the finger portion 42*a* is confined within the channel 50 to prevent pivotal movement of the lever 42 regardless of attempted movement of the selector plate 22 until such time as the slide bar assembly is again in its fully locked condition. The same description holds true with regard to the slide bar assembly 34; the only difference being that the fingered lever 42 will be moved to the left as in FIG. 4 to engage the notch within the locking member 43**.

To cause movement of the fingered lever 42 on each of the actuating devices within the tuner housing 10, a selector pin 52 extends upwardly from the fingered lever into one or the other of a pair of parallel elongated slots 53 and 54 which serve to guide the selector pin forwardly and rearwardly upon actuating or pulling of the pushbutton 12. A passage 56 is formed between the slots 53 and 54 to allow the selector pin 52 to move between the slots 53 and 54 upon actuation of the selector plate 22 when and only when all of the pushbuttons are in a neutral condition as shown in FIG. 2 with the selector pins 52 substantially in registry with the passageways 56. When any one of the pushbuttons 12–16 is depressed to select a radio station, the associated selector pin 52 will move forwardly of the neutral position along its slot, here illustrated as slot 54 and prevent actuation of the selector plate 22 until such time as the selector pin 52 is again in the neutral position. However, when it is desired to adjust or fix a new preselected condition on any particular actuating device, the pin 52 moves rearwardly within the slot. After the desired radio station is selected by manual tuning the pushbutton 12 is pressed forward to again lock the actuating device so that the cam 41 is fixed in position to always return the tuning mechanism to the preselected station. However, during the time of relocking the cam 41, the pin 52 will pass the passageway 56 and should the selector lever **22*a* be pressured laterally to cause a change in AM or FM reception the selector pin 52 may inadvertently cross over to the next slot before the slide bar assembly is in a locked condition. This action would jam the entire mechanism if it were not for the guide channel 50 in which the finger portion 42*a* travels and is confined under all unlocked conditions of the slide bar assembly 32**. This action is true for any of the slide bar assemblies associated with the tuner.

Preferably, each of the levers 42 pivots about a stationary bushing 60 which is securely held in place on a rectangular stud portion 61 formed on the pushbutton actuating rod 30. However, it will be understood that the fingered lever 42 may be pivotally mounted in any suitable manner so long as the fingered portions **42*a* and 42*b* selectively engage with the aligned notches formed in the slide bar assemblies 32 and 34. The selector plate 22 includes a plurality of elongated slots 62 which align with either one of the slots 53 and 54 in the guide plate 20, and only shiftable between these two portions so long as all the selector pins 52 are in alignment with the passageways 56 between the elongated slots 53 and 54**.

What has been described is a simple and efficient pushbutton selecting mechanism wherein a single group of pushbutton devices engage either one of two groups of slide bar assemblies for tuning the receiver to either AM or FM groups of stations. The slide bar assembly together with a pushbutton actuating bar form a guide channel to confine selector means and prevent jamming of the device. Accordingly, it will be understood that variations and modifications of this invention may be effected without departing from the spirit and scope of the novel concepts disclosed and claimed herein.

I claim:

1. A tuning mechanism for use in a combination AM-FM radio receiver, comprising in combination:

a housing having an apertured front wall;

a tuning mechanism positioned within the said housing to be selectively actuated to any one of a plurality of predetermined radio stations by the manipulations of a pushbutton;

a plurality of pushbutton actuating bars positioned within the said housing and arranged and spaced from one another to have a pushbutton receiving portion thereof extending centrally of an associated aperture in said front wall to receive a pushbutton;

a first group of slide bar assemblies positioned immediately adjacent one side of an associated pushbutton actuating bar, and a second group of slide bar assemblies positioned immediately adjacent the other side of an associated pushbutton actuating bar, each slide bar assembly including a guide member which carries an actuating cam on the side thereof opposite said associated pushbutton actuating bar, and a locking member interposed between said guide member and said associated pushbutton actuating bar, said guide member and said locking member having notches formed therein to be in alignment when said guide member and said locking member are in a locked together condition firmly to hold said actuating cam and to be in misalignment when said guide member and said locking member are in an unlocked condition to allow adjustment of said actuating cam, and an extended portion formed on each of said guide members extending in the direction of and in parallel with said pushbutton actuating bar to form a guide channel therewith;

a fingered lever pivotally secured to each of said pushbutton actuating bars and having a finger portion located on each side of an associated pushbutton actuating bar selectively to engage the notch in one or the other of said locking members within said first or second group of slide bar assemblies to be released by linear movement of said pushbutton actuating bar and the finger engaging the same will move along the guide channel formed by said guide member and said pushbutton actuating bar to be at all times confined therein while said locking member is in an unlocked condition; and selector means to pivot each of said fingered levers to have the finger portions thereof engage with said first group of slide bar assemblies in one position and to engage with said second group of slide bar assemblies in another position.

2. The tuning mechanism of claim 1 wherein said fingered lever is triangularly shaped being pivotal near one apex thereof with said finger portions formed at the other apexes and extending in a direction substantially parallel to the axis of pivotal movement to move freely through the notches formed in said guide member and said locking member.

3. The tuning mechanism of claim 1 wherein when one finger portion of said fingered lever engages the notch formed in one of said locking members to move the associated slide bar assembly upon depression of the pushbutton associated therewith the other finger portion of said fingered lever extends beyond the other guide member of said slide bar assembly located on the other side of said pushbutton actuating bar.

4. The tuning mechanism of claim 1 wherein said selector means includes a stationary plate extending from said front wall, said plate having a plurality of parallel pairs of elongated slots formed therein and a passageway between each pair of slots, said fingered lever having a selector pin extending therefrom for movement along one or the other of said pair of elongated slots and through said passageway by actuation of said selector means to engage said first group of slide bar assemblies in one position and to engage said second group of slide bar assemblies in another position.

5. The tuning mechanism of claim 4 wherein said passageway is located substantially centrally of the elongated slots thus forming an H-shaped slot configuration, said selector pin moving along one or the other of said slots between said front wall and said passageway during pushbutton-selection operation of the associated pushbutton, and said selector pin moving between said passageway and the most remote portion of said slot from said front wall when said pushbutton is actuated to release said locking mechanism, and relocking of said locking mechanism will cause one of the finger portions on the fingered lever to remain in contact with the guide channel formed by said guide member and said pushbutton actuating bar to prevent said selector pin from moving through said passageway during the relocking operation.

6. The tuning mechanism of claim 4 wherein said selector means includes a slide plate adjacent and parallel to said stationary plate having a plurality of single elongated slot means formed therein to cooperate with plurality of H-shaped slots to guide said selector pin through said passageway to select either said first or said second group of slide bar assemblies to be actuated.

7. A tuner mechanism for use in a combination AM-FM radio receiver, comprising in combination, a housing for containing frequency selector means to be actuated by pushbutton manipulation to a desired radio station setting, a band selector switch for selecting the desired radio band, a plurality of pushbutton actuating bars extending from the housing to be manipulated to engage the frequency selector means for selecting the desired radio station setting, first and second slide assemblies associated with each pushbutton actuating bar on each side thereof, each of said slide assemblies having a memory cam for engagement with said frequency selector means, selector means pivotally connected to each of said pushbutton actuating bars and extending therefrom to engage one of the other of said first or second slide assemblies, a fixed plate positioned adjacent and pushbutton actuating bars and their associated first and second slide assemblies, said fixed plate having a plurality of pairs of parallel slots formed therein with a passage communicating between the slots thus forming an H configuration, each pair of parallel slots being associated with a given pushbutton actuating bar and its first and second slide assemblies, a movable plate immediately adjacent said fixed plate and having a plurality of single slots formed therein each to be in alignment with one or the other of the slots of said pair of parallel slots depending on the position of said band selector switch, and a guide pin extending from said selector means into one of the associated pairs of parallel slots of said fixed plate and the associated single slot of said movable plate, whereby movement of said movable plate between the two positions will move said guide pin through said passage to locate said guide pin in one or the other of said parallel slots, and linear movement of said guide pin in one of said pair of slots and displaced from said passage will prevent jamming by preventing actuation of said band selector switch connected thereto.

8. The tuner mechanism for a combination AM-FM radio, according to claim 7 wherein each of said first and second slide assemblies includes portions cooperating with said associated actuating bar to form a channel therewith when one of said first and second slide assemblies is connected to said actuating bar and pulled outwardly so as to affect release of the memory cam within the radio housing, and a depending finger extending from said selector means into said channel to prevent inadvertent crossover of said guide pin from one slot to the other slot through said passage between said pair of parallel slots during relocking of the actuating cam.

* * * * *